United States Patent [19]

Donovan, Sr.

[11] Patent Number: 5,393,215
[45] Date of Patent: Feb. 28, 1995

[54] CENTRIFUGAL RESIN TRANSFER MOLDING

[75] Inventor: Thomas P. Donovan, Sr., West Haven, Conn.

[73] Assignee: United Technologies Corporation, Hartford, Conn.

[21] Appl. No.: 998,095

[22] Filed: Dec. 30, 1992

[51] Int. Cl.⁶ .................. B29C 45/02; B29C 45/04; B29C 45/14
[52] U.S. Cl. .................... 425/129.1; 264/257; 264/311; 264/328.4; 425/425; 425/434; 425/544
[58] Field of Search ............... 264/257, 258, 510, 511, 264/310, 311, 328.4; 425/425, 434, 544, 129.1, 116

[56] References Cited

U.S. PATENT DOCUMENTS

| | | | |
|---|---|---|---|
| 2,633,605 | 4/1953 | Breucker | 425/434 |
| 3,137,750 | 6/1964 | Gringras | 264/257 |
| 3,981,955 | 9/1976 | Otani et al. | 264/311 |
| 4,063,863 | 12/1977 | Hilmoe | 425/425 |
| 4,190,411 | 2/1980 | Fujimoto | 425/434 |
| 4,258,917 | 3/1981 | Murphy | 264/311 |
| 4,350,481 | 9/1982 | Corea et al. | 425/425 |
| 4,479,769 | 10/1984 | Simioni | 425/425 |
| 4,560,523 | 12/1985 | Plumley et al. | 425/129.1 |
| 4,714,578 | 12/1987 | Cagle et al. | 264/311 |
| 4,723,904 | 2/1988 | Maynard et al. | 425/425 |
| 4,752,201 | 6/1988 | Kaufmann et al. | 425/544 |
| 4,810,183 | 3/1989 | Place et al. | 425/434 |
| 4,865,787 | 9/1989 | Vallance et al. | 264/311 |
| 4,909,724 | 3/1990 | Sonoda et al. | 425/544 |

*Primary Examiner*—Jay H. Woo
*Assistant Examiner*—Duane S. Smith
*Attorney, Agent, or Firm*—William W. Jones

[57] ABSTRACT

Structural parts are produced from fiber composite preforms which are placed into a mold conforming to the shape of the desired part. A resin is then injected into the mold so as to fill the mold and encapsulate the fiber preform. The mold is evacuated prior to the injection step, and is rotated about a vertical axis during the injection step. The resin is maintained under pressure during the injection step, and the resin is hardened in the mold whereby net molded parts are formed.

7 Claims, 4 Drawing Sheets

CENTRIFUGAL RESIN TRANSFER MOLDING

TECHNICAL FIELD

This invention relates to the production of structural parts which are made from a high strength fiber component or components, and a solidified resin component in which the fiber component is encased. More particularly, this invention relates to a method for forming such structural parts which method involves the steps of positioning the fiber component or components in a part-conforming mold cavity; and injecting the resin component into the mold cavity under pressure while rotating the mold cavity about an axis which is perpendicular to planes containing the fiber components.

BACKGROUND ART

Fiber component/resin component composite structural parts are presently formed by injection molding of the resin component into a mold containing the preformed fiber component. The mold cavity containing the fiber preform will be evacuated prior to injecting the resin into the mold cavity; however, present methods nevertheless encounter problems in ensuring that the fiber preforms are completely encased and saturated by the resin, and that the resultant parts are "net molded" parts, i.e., that the resin is able to completely fill the mold cavity so that minimal post molding modification of the resultant parts is necessary. It is highly desirable to produce net molded parts because of the relatively fragile nature of the fiber preforms, and their tendency to disintegrate when subjected to excessive post molding rework. The reason for this fiber preform structural fragility is that the preforms, while exhibiting very high tensile strength, are essentially only two-dimensional woven sheets of cloth, or merely two-dimensional sheets of parallel fiber strands. These preforms possess negligible through-plane strength or cohesion.

The problem that causes the difficulty in producing the net molded final parts is that the resin, when injected into the mold containing the fiber preforms, must move through the mold cavity in the in-plane direction of the fiber preforms, since the preforms will in many cases be arranged parallel to the direction of flow of the incoming resin so that the resin will have to flow from one end of each fiber preform sheet to the other end (or in the "in plane" direction of the preforms) in order to fill the mold cavity. At the same time, the resins used in forming such articles are usually thermosetting resins and will tend to begin setting up relatively quickly after their complimentary components are brought together in a premix chamber, or in the mold cavity once the proper temperature has been reached. Thus, it is difficult to ensure that the fiber preforms will be thoroughly saturated with the resin, and that the resin will completely fill the mold cavity, so as to produce a net molded part that requires little or no subsequent modification.

It would be desirable to be able to increase the pressure head or force throughout the entire procedure with which the resin is caused to flow through the preforms and mold cavity, over and above that which results from pressurizing the resin components, and depressurizing the mold cavity, as are presently done.

DISCLOSURE OF THE INVENTION

This invention relates to a method and apparatus for injection molding fiber/resin composite parts wherein the pressure head of the injected resin is increased so as to enhance the ability to produce net molded structural parts. In accordance with this invention, the mold or molds in which the parts are formed are centrifuged about an axis which is perpendicular to the direction of flow of the resin in the mold cavity, and perpendicular to the plane or planes of the fiber preforms which are disposed in the mold cavity or cavities during the injection step.

Centrifugal molding techniques are known generally in the prior art, however, the resultant products formed from such techniques are usually cylindrical or tubular. U.S. Pat. Nos. 4,515,547 to Rother, et al., and 4,518,342 to Bourca disclose procedures for producing fiber-reinforced poles involving the placement of fiberglass strands in a mold and centrifuging a resin into the fiberglass strands. U.S. Pat. No. Re. 25,587 to Wiltshire and 4,611,980 to Tsuji, et al. disclose procedures for forming composites wherein fibers and resin are both fled into a centrifugal mold at the same time; while U.S. Pat. No. 3,363,479 to Pickels discloses the placement of both fiber and resin into a mold at the same time, and thus centrifuging the mold.

In the method and apparatus of this invention, the part mold will contain one or more mold cavities, and will be rotatable about an axis of symmetry, which is preferably a vertical axis. When the part being formed is one that is itself a rotating part, such as a helicopter rotor blade hub, for example, there will be a single mold cavity and the axis of rotation of the mold will conform to the axis of rotation of the finished part. Rotating fans such as turbine fans, compressor fans, cooling fans, or the like can also be produced using the method of this invention. When the part being formed is not itself a rotating part, such as a helicopter stabilizer fin, for example, the mold assembly will preferably take the form of a carousel, with the individual mold cavity parts being arranged radially of the axis of rotation and spaced apart circumferentially of the carousel. In the latter case, the mold cavities will each be elongated radially of the axis of rotation of the mold assembly. In both cases, the fiber preforms will be arranged in the mold cavity or cavities with their planar surfaces extending perpendicular to the axis of rotation of the mold assembly. The injected resins will thus move through the mold cavity or cavities in the in-plane direction relative to the fiber preforms, i.e., the resin will flow lengthwise through each of the preform components, be they parallel fibers, or a woven fiber cloth.

In practicing the invention, the mold cavities will be evacuated after the preforms are disposed therein. The resin components will be injected into the mold cavities through a central plenum from a pressurized resin source. The resin source will preferably be fixed spatially, and the line or lines from the resin source to the central plenum will include a swivel joint which will accommodate the rotational movement of the mold assembly. The injection step will thus take place after the mold assembly has been brought up to full centrifugation speed. Since the resin must flow lengthwise through the mold cavity or cavities, it will be appreciated that the further away that the resin gets from the axis of rotation, the greater pressure head it will be subjected to because of the progressive increase in the amount of resin entering the mold behind the leading edge of the resin. The fact that the entire mold cavity is pre-evacuated ensures even distribution of the resin in the mold cavity, and therefore in the resultant part.

It is therefore an object of this invention to provide a method and apparatus for forming net molded fiber/resin composite structural parts which enhances complete mold cavity and fiber component saturation by the resin component.

It is an additional object of this invention to provide a method and apparatus of the character described which produces an increased pressure head on resin being injection molded into a mold cavity containing fiber preforms.

It is a further object of this invention to provide a method and apparatus of the character described wherein both rotary and non-rotary parts can be formed.

It is yet another object of this invention to provide a method and apparatus of the character described wherein rotary parts formed thereby can be essentially spin-balanced during the formation of the part.

These and other objects and advantages of the invention will become more readily apparent to those skilled in the art from the following detailed description of a preferred embodiment of the invention, when taken in conjunction with the accompanying drawings, in which:

BEST MODE FOR CARRYING OUT THE INVENTION

Figure 1:
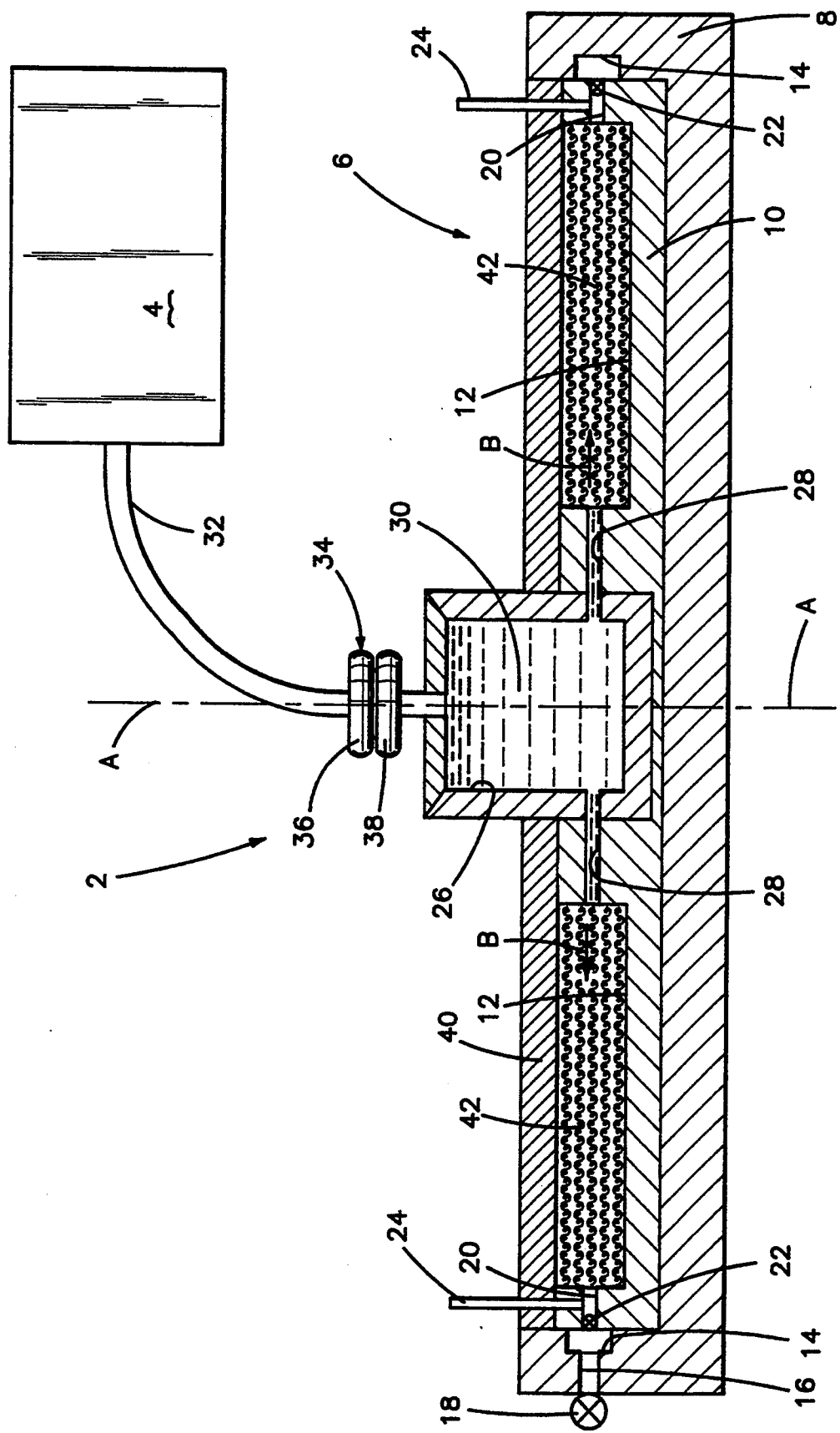
FIG. 1 is a schematic elevational view, partially in section, of a first embodiment of an injection molding assembly embodying the invention.
Figure 2:
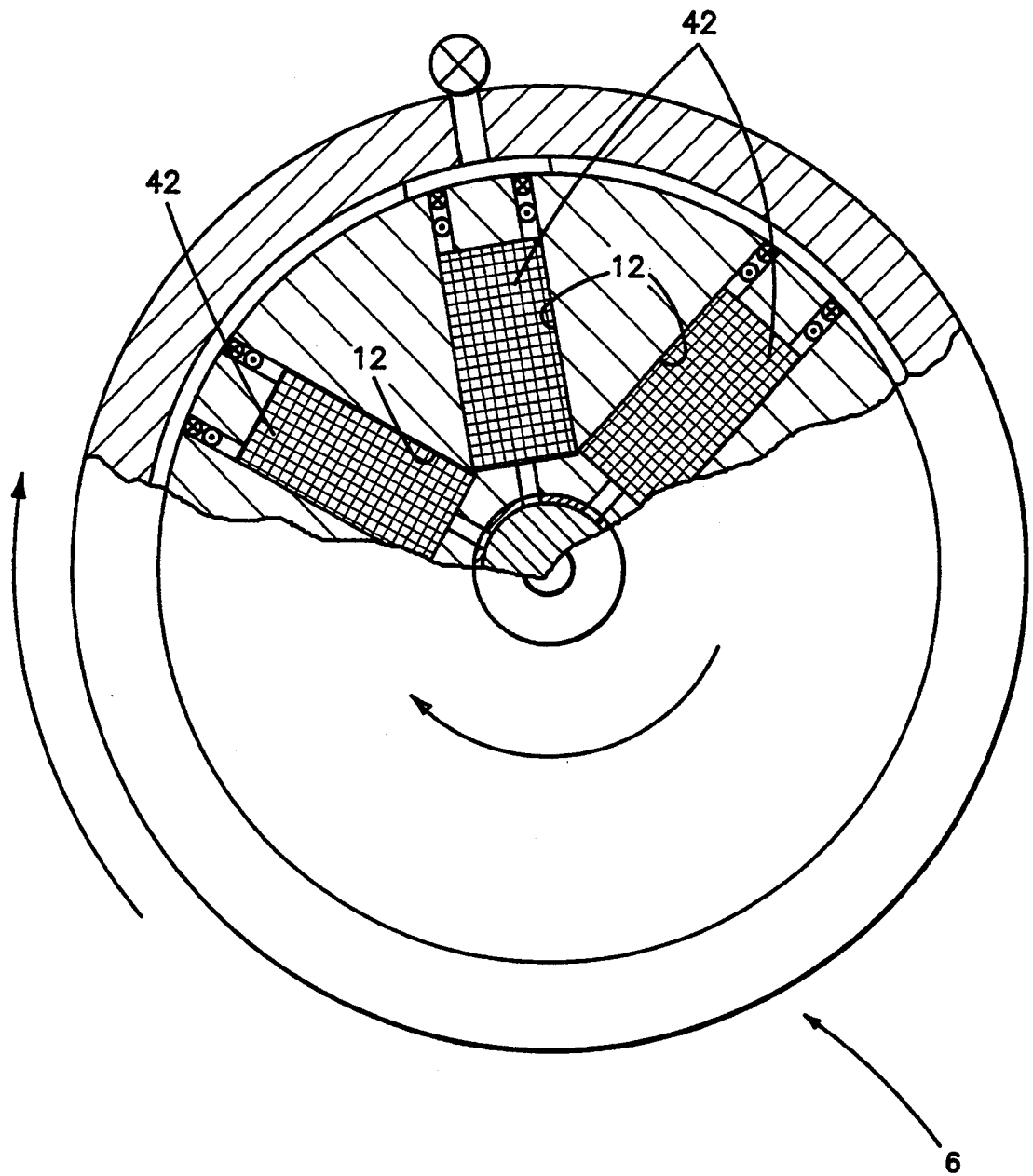
FIG. 2 is a plan view, taken partially in section, of the assembly of FIG. 1.

Referring now to the drawings, there is shown in FIGS. 1 and 2 a somewhat schematic elevational sectional view of a mold assembly which may be used to perform the method of this invention. The mold assembly, denoted generally by the numeral 2, includes a resin source reservoir 4 which is pressurized and which serves as the source of the resin component of the molded parts. The centrifugal mold portion of the mold assembly 2 is denoted generally by the numeral 6. The mold 6 includes a bed 8 which may be mounted for rotational movement about a vertical axis A. A mold cavity insert is mounted in the bed 8 and includes one or more radially extending recesses that form the cavity or cavities 12 in which the molded part or parts are formed. The bed 8 includes an annular chamber 14 which can be evacuated through a passage 16 having a check valve 18 associated therewith. Each cavity 12 communicates with the chamber 14 through passages 20 which may also be equipped with check valves 22. Sight gauges 24 may be associated with each mold cavity 12 for use in determining cavity fill. Each cavity 12 communicates with a central resin plenum 26 via radial passages 28. The plenum 26 receives the liquid resin 30 from the reservoir 4 through a feed tube 32 which includes a swivel joint 34 which has a stationary part 36 and a rotational part 38. A removable platen 40 closes the top of the mold cavities 12. It will be noted that each mold cavity 12 will be filled with the proper amount of woven fiber preforms 42. During the resin injection process, the resin will flow radially of the mold 6, as shown by the arrows B, and in the in-plane direction for the fiber preforms 42. Thus the resin will flow from one end of the preforms 42 to the other. The further away from the axis A the resin moves, the greater the driving force, or head, in the resin flow is. The combined use of cavity vacuum, positive resin pressure, and centrifugal force enables the resin to move through the fiber preforms along the in-plane direction of the preforms whereby net-molded parts can be formed in spite of the presence of the preform sheets in the mold cavity. It will be noted from FIG. 2 that there are a plurality of radially elongated mold cavities 12 in the mold 6 so that a number of separate relatively elongated parts can be formed from a single injection operation. In the specific embodiment shown, the formed parts are used as the core part of composite helicopter stabilizers.

Figure 3:
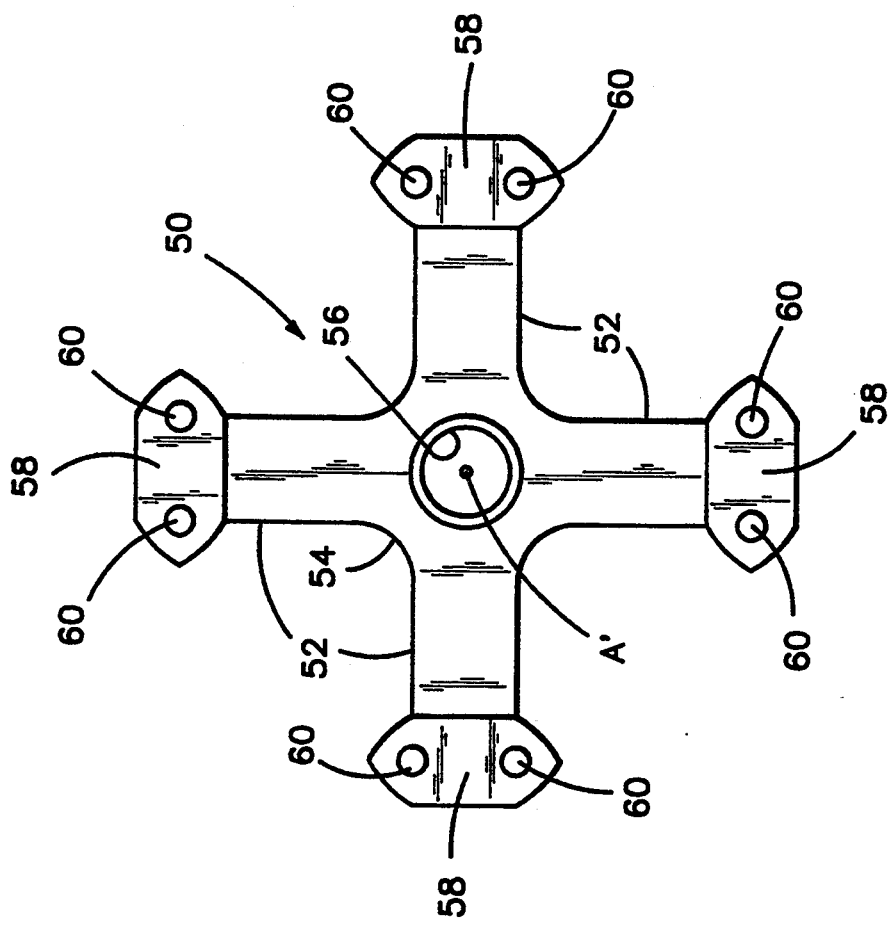
FIG. 3 is a plan view of a helicopter rotor hub formed in accordance with this invention.

Referring to FIG. 3, there is shown a helicopter rotor hub, denoted generally by the numeral 50, that has been formed in accordance with this invention. The axis of rotation $A^1$ of the hub 50 is coextant with the axis of rotation A of the mold assembly in which the hub 50 was formed. Instead of having a plurality of separate radial mold cavities as previously described, the mold assembly will have one complex mold cavity that conforms in shape to the hub 50, and which has the necessary cavity configuration to form the four 90° spaced-apart arms 52, the central web 54, and the axial cavity 56. The outer extremities 58 of the arms 52 are enlarged and are provided with bushing cavities 60 that are formed in situ during the molding operation with removable plugs placed in the mold cavity. It will be appreciated that the woven fiber preforms are disposed coplanar with the plane of FIG. 3. When parts are formed in accordance with this invention which rotate when in operation about an axis which coincides with the axis of rotation of the centrifugal mold, the resultant parts should have improved inherent spin balance stability, and should require minimal spin balance adjustment.

Figure 4:
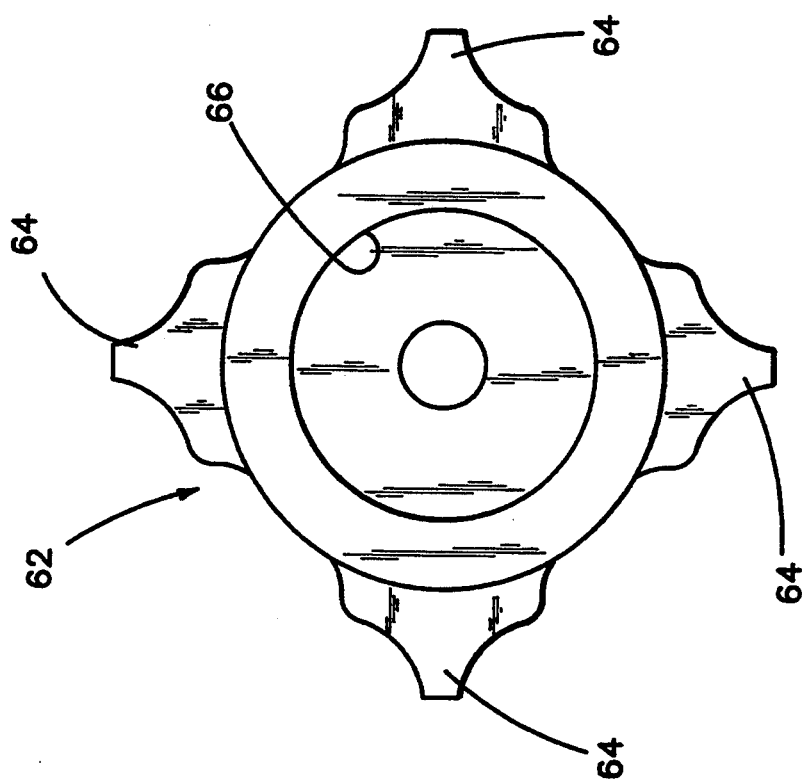
FIG. 4 is a side-elevational view, taken partially in section, of a resin injection plenum which is useful for quickly degassing and dispersing the liquid resin into the mold cavity.

Referring to FIG. 4, there is shown a preferred embodiment of a resin plenum for use in forming multiple identical parts by the method of this invention. The plenum 62 shown in FIG. 4 is designed for use with a four-mold cavity mold assembly. Each cavity is connected to a resin flow controlling vane 64 which opens into the central resin chamber 66. The vanes 64 increase resin flow pressure or head, and also serve to degas the liquid resin before it enters the mold cavities. The plenum 62 can also be equipped with internal heating elements which maintain the proper resin temperature right up until the resin flows into the mold cavities.

Figure 5:
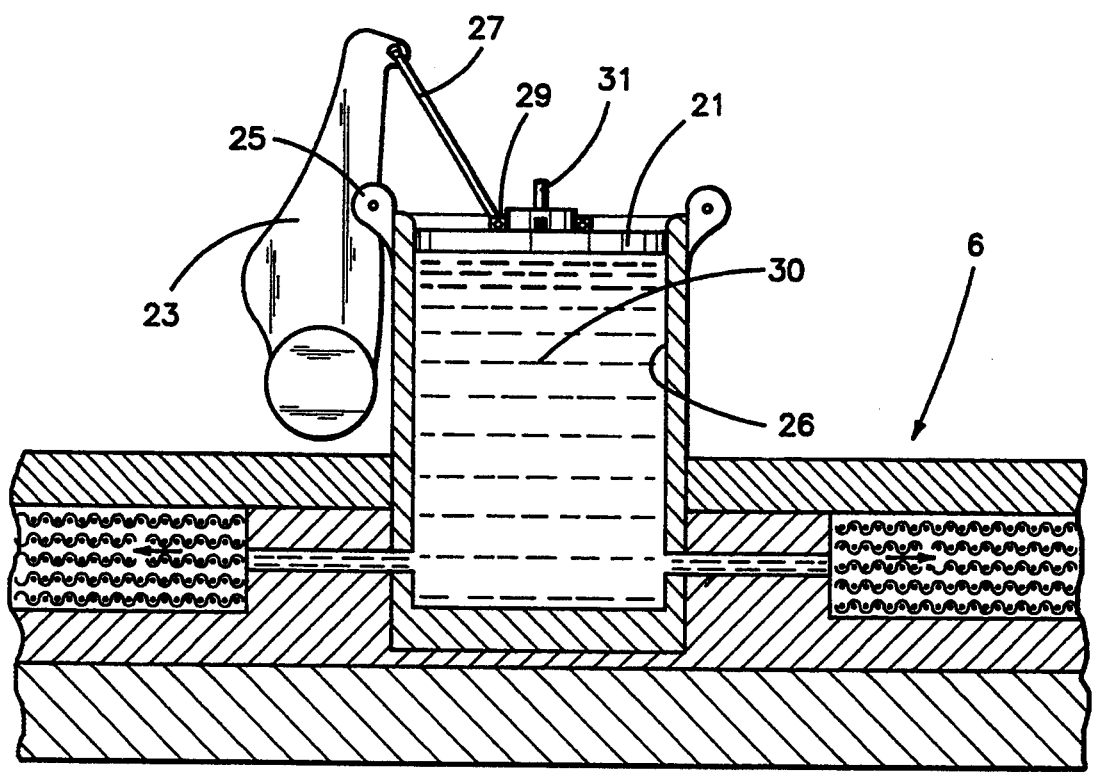
FIG. 5 is a fragmented sectional view similar to FIG. 1 but showing a second embodiment of the invention having a self-contained resin-pressurizing reservoir.
Figure 6:
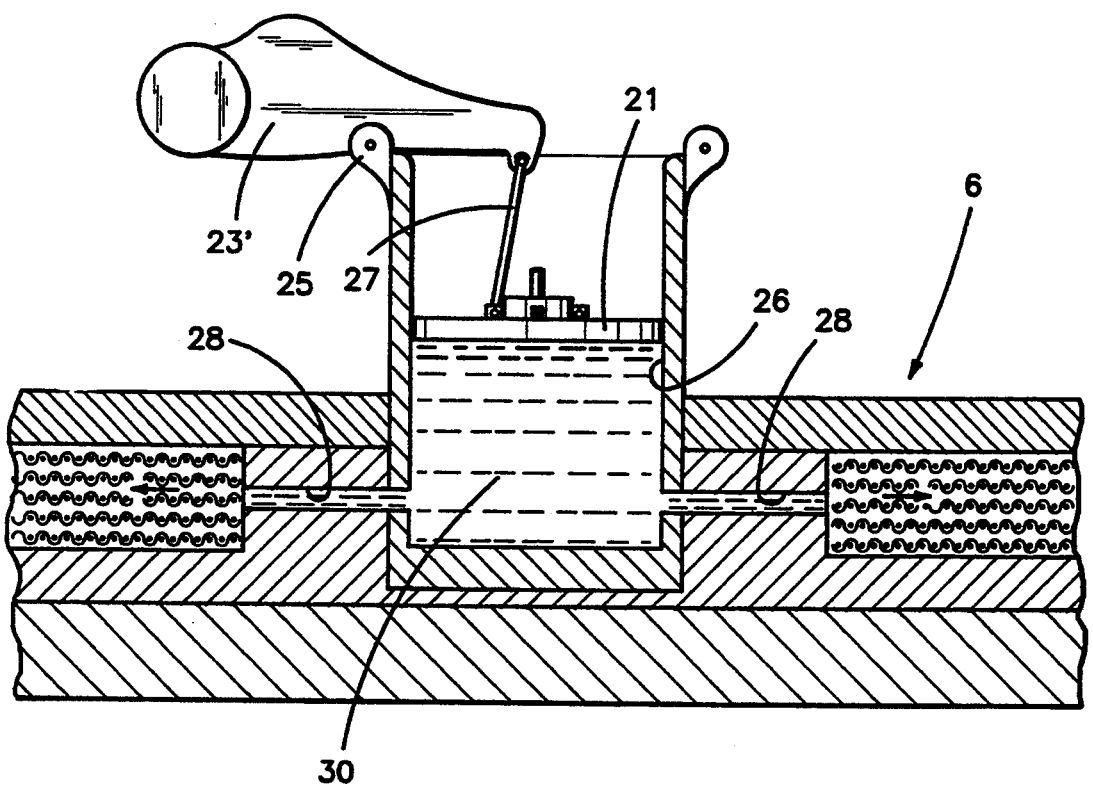
FIG. 6 is a view similar to FIG. 5 but showing the resin reservoir during the injection operation.

Referring now to FIGS. 5 and 6, there is shown an embodiment of the invention, wherein the resin plenum 26 is modified to pressurize the resin 30 during the centrifugation operation. The plenum 26 is provided with a piston 21 which closes the plenum top, and provides a sealed cover for the resin mass 30. The piston 21 is reciprocally slidably movable in the plenum 26. There are a plurality of pressure generators 23 pivotally mounted on ears 25 positioned on the rim of the plenum 26. There can be three or four of the generators 23 mounted on the plenum 26. The generators 23 are connected to rods 27, which in turn are connected to yokes 29 on the upper surface of the piston 21. The piston 21 is also fitted with a one-way nozzle 31 so that the plenum 26 can be filled with resin 30.

Once the plenum is filled, the fitting hose (not shown) is disconnected from the nozzle 31, and the assembly 6 is spun about its vertical axis at the appropriate RPM, depending on the resins used, and the parts being molded. The centrifugal force which forces the resin 30 into the part cavities also causes the pressure generators to pivot to the positions 23' (shown in FIG. 6) and beyond, thereby forcing the piston 21 downwardly in the plenum 26 via the rods 27. The resin 30 is thus pressurized by the piston 21 and forced into the radial passages 28. The centrifugation of the assembly 6 thus pressurizes the resin in the plenum 26, and also provides the resin head pressure in the cavities.

It will appreciated that the procedure of this invention can be used to form a plurality of separate composite parts in a single casting operation, or can be used to form, in situ, spin balanced single rotating parts. The resin is provided with enhanced flow impetus, or head, so that net molded parts, i.e., parts resulting from a mold cavity which is completely filled with resin, can be formed, despite the fact that the resin flows through the mold cavity in a direction which is in-plane relative to the woven planar fiber preforms disposed in the mold cavity.

The fiber preforms can be formed from glass fibers, graphite fibers, ceramic fibers, Kevlor® fibers and other high strength fiber materials. Resins suitable for use in the procedure of this invention include thermosetting resins such as epoxies and related thermo plastics, and hardeners. One particular epoxy which may be used is that sold by Dow Chemical Company under the trademark "Taxtic 123"; and a Dow hardener sold under the trademark "H41". The rotational speed of the mold assembly will preferably be about 10,000 for smaller components, and at lower RPM's for larger components. The important objective is to develop about a 50 psi resin pressure as the resin flows into the mold cavities. Typical composite parts will contain approximately equal proportions by volume of fiber and resin. The vacuum drawn in the mold cavities will preferably be one atmosphere.

The procedure of this invention will produce more completely resin-saturated net-molded parts, and will also provide inherent improved spin balancing for rotating operating parts.

Since many changes and variations of the disclosed embodiments of the invention may be made without departing from the inventive concept, it is not intended to limit the invention otherwise than as required by the appended claims.

What is claimed is:

1. Apparatus for centrifugal resin transfer molding of resin/fiber composite parts, said apparatus comprising:
    a) a centrifugal molding assembly which is rotatable about a vertical axis;
    b) a resin plenum disposed centrally on said molding assembly, said resin plenum having an axis of symmetry which conforms to said vertical axis;
    c) means forming at least one mold cavity radially outwardly of said resin plenum;
    d) at least one radial passage extending from said plenum to said mold cavity, said passage being operable to transfer resin from said plenum to said cavity when said molding assembly is rotated about said vertical axis;
    e) means for pressurizing resin in said plenum,, said means for pressurizing comprising a piston mounted in said plenum and closing an upper end thereof; and centrifugally operated pressure-generating means mounted on said plenum and connected to said piston, said pressure-generating means being operable through centrifugal force to drive said piston toward a lower end of said plenum to pressurize resin in said plenum to provide an auxiliary force for transferring resin from said plenum to said cavity; wherein planar fiber preforms are disposed in said cavity and oriented so that resin flowing into said cavity will fill said cavity while flowing in an in-plane direction relative to said fiber preforms.

2. The apparatus of claim 1 wherein said molding cavity is a single cavity which forms an operationally rotating component and wherein said cavity has a rotational axis of symmetry which conforms to said vertical axis.

3. The apparatus of claim 1 wherein said means forming creates a plurality of separate mold cavities symmetrically disposed about said vertical axis.

4. The apparatus of claim 1 wherein said means for pressurizing comprises a stationary pressurized resin reservoir connected to said plenum by means of a tubular conduit having a swivel joint therein to accommodate rotation of said molding assembly.

5. The apparatus of claim 1 wherein said piston includes a one-way fill nozzle for transferring resin into said plenum.

6. The apparatus of claim 1 wherein said centrifugal molding assembly and said means for pressurizing are operable to pressurize the resin to a pressure of at least about 50 psi.

7. Apparatus for centrifugal resin transfer molding of resin/fiber composite parts, said apparatus comprising:
    a) a centrifugal molding assembly which is rotatable about a vertical axis;
    b) a resin plenum disposed centrally of said molding assembly, said resin plenum having an axis of symmetry which conforms to said vertical axis;
    c) a piston closing an upper end of said resin plenum, said piston being vertically reciprocally movable in said plenum;
    d) centrifugally actuated pressure generating means mounted on said plenum and connected to said piston, said pressure generating means being operable to force said piston downwardly in said plenum when said molding assembly is rotated about said vertical axis to pressurize resin in said plenum;
    e) means forming at least one mold cavity radially outwardly of said resin plenum; and
    f) at least one radial passages extending from said plenum to said mold cavity, said passages being operable to transfer resin from said plenum to said cavity when said molding assembly is rotated about said vertical axis.

* * * * *